US012591321B2

(12) United States Patent
Tan et al.

(10) Patent No.: US 12,591,321 B2
(45) Date of Patent: Mar. 31, 2026

(54) DIAL BASED HUMAN INTERFACE DEVICE

(71) Applicant: Dell Products L.P., Round Rock, TX (US)

(72) Inventors: Loo Shing Tan, Singapore (SG); Michiel Sebastiaan Emanuel Petrus Knoppert, Amsterdam (NL); Gerald Rene Pelissier, Mendham, NJ (US); Thomas Marcus Hinskens, Utrecht (NL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/788,432

(22) Filed: Jul. 30, 2024

(65) Prior Publication Data

US 2026/0037083 A1    Feb. 5, 2026

(51) Int. Cl.
*G06F 3/0362* (2013.01)
*G06F 3/01* (2006.01)

(52) U.S. Cl.
CPC ............ *G06F 3/0362* (2013.01); *G06F 3/016* (2013.01)

(58) Field of Classification Search
CPC ............................... G06F 3/0362; G06F 3/016
See application file for complete search history.

(56) References Cited

U.S. PATENT DOCUMENTS

| | | | | |
|---|---|---|---|---|
| 6,222,525 B1 * | 4/2001 | Armstrong | ............. | H01H 25/00 |
| | | | | 345/161 |
| 6,563,533 B1 * | 5/2003 | Colby | .................... | H04N 7/181 |
| | | | | 348/E7.086 |
| 6,636,197 B1 * | 10/2003 | Goldenberg | ............. | G05G 1/08 |
| | | | | 345/184 |
| 6,902,332 B2 | 6/2005 | McLoone | | |
| 7,248,252 B2 * | 7/2007 | Amari | .................... | B60K 35/10 |
| | | | | 345/184 |
| 7,368,673 B2 * | 5/2008 | Sato | ....................... | H01H 25/04 |
| | | | | 200/5 R |
| 7,390,985 B2 * | 6/2008 | Onodera | ................. | G06F 3/016 |
| | | | | 345/184 |
| 7,518,745 B2 * | 4/2009 | Guerraz | .................. | G06F 3/016 |
| | | | | 358/448 |
| 7,570,254 B2 * | 8/2009 | Suzuki | .................. | G06F 3/0362 |
| | | | | 345/157 |
| 7,643,017 B2 * | 1/2010 | Lai | ......................... | B60K 35/10 |
| | | | | 345/157 |
| 8,190,993 B2 * | 5/2012 | Kondo | .................... | G06F 1/169 |
| | | | | 345/157 |

(Continued)

FOREIGN PATENT DOCUMENTS

WO          2007114631 A2    10/2007

*Primary Examiner* — Benyam Ketema

(74) *Attorney, Agent, or Firm* — WOMBLE BOND DICKINSON (US) LLP

(57) ABSTRACT

Methods and systems for providing computer implemented services using user input are disclosed. To obtain the user input, a passive human interface device may be used. The human interface device may encode information regarding actuations of the human interface device in magnetic field distributions emanating from the human interface device. The magnetic field distribution may be sensed to identify user input provided by a user of the human interface device. The user input may be used to provide the computer implemented services.

20 Claims, 11 Drawing Sheets

(56)                References Cited

U.S. PATENT DOCUMENTS

| | | | | |
|---|---|---|---|---|
| 8,217,742 B2* | 7/2012 | Trudeau | G05G 1/10 | |
| | | | 335/206 | |
| 8,368,649 B2 | 2/2013 | Hall | | |
| 8,581,718 B2* | 11/2013 | Muller | B60K 35/22 | |
| | | | 345/184 | |
| 8,654,095 B1 | 2/2014 | Cho et al. | | |
| 8,796,566 B2* | 8/2014 | Kerner | H01H 25/06 | |
| | | | 200/4 | |
| 8,918,219 B2* | 12/2014 | Sloo | G05D 23/1917 | |
| | | | 236/1 C | |
| 9,195,351 B1 | 11/2015 | Rosenberg | | |
| 9,285,903 B1 | 3/2016 | Yun | | |
| 9,323,356 B2 | 4/2016 | Kuo | | |
| 9,459,794 B1 | 10/2016 | Soegiono | | |
| 9,785,272 B1 | 10/2017 | Rosenberg | | |
| 10,331,220 B2 | 6/2019 | Hautson | | |
| 10,423,245 B2 | 9/2019 | Keating | | |
| 10,436,567 B2* | 10/2019 | Hautson | G01V 3/081 | |
| 10,502,271 B2* | 12/2019 | Battlogg | F16D 57/002 | |
| 10,504,672 B2* | 12/2019 | Hu | H01H 19/14 | |
| 10,649,556 B2* | 5/2020 | Chu | H01H 25/065 | |
| 10,719,145 B1 | 7/2020 | Files et al. | | |
| 10,838,525 B2* | 11/2020 | Chu | G06F 3/0362 | |
| 10,845,764 B2* | 11/2020 | Ely | H01H 25/065 | |
| 10,921,914 B2 | 2/2021 | Hu | | |
| 10,962,935 B1* | 3/2021 | Ely | G04G 21/00 | |
| 11,036,318 B2* | 6/2021 | Bokma | G06F 3/03547 | |
| 11,048,344 B1* | 6/2021 | Drezet | H01F 7/20 | |
| 11,106,291 B2* | 8/2021 | Takaoka | G06F 3/044 | |
| 11,360,440 B2* | 6/2022 | Perkins | G04C 3/004 | |
| 11,387,058 B2* | 7/2022 | Hwang | H01H 25/06 | |
| 11,531,306 B2* | 12/2022 | Ely | G06F 3/0362 | |
| 11,809,646 B1 | 11/2023 | Knoppert et al. | | |
| 11,861,076 B1* | 1/2024 | Tan | G06F 3/02 | |
| 11,874,687 B1 | 1/2024 | Tan | | |
| 11,886,700 B1 | 1/2024 | Lee | | |
| 11,907,449 B2* | 2/2024 | Nieh | G06F 3/0393 | |
| 11,923,842 B1 | 3/2024 | Tan | | |
| 2005/0083316 A1* | 4/2005 | Brian | G06F 3/0346 | |
| | | | 345/179 | |
| 2006/0012584 A1* | 1/2006 | Vassallo | G06F 3/016 | |
| | | | 345/184 | |
| 2006/0082545 A1* | 4/2006 | Choquet | G05G 1/105 | |
| | | | 345/156 | |
| 2006/0092136 A1* | 5/2006 | Nishimura | G06F 3/03549 | |
| | | | 345/167 | |
| 2006/0205368 A1 | 9/2006 | Bustamante et al. | | |
| 2007/0152988 A1* | 7/2007 | Levin | G06F 3/016 | |
| | | | 345/184 | |
| 2007/0171205 A1 | 7/2007 | Steinberg | | |
| 2008/0231595 A1* | 9/2008 | Krantz | H04N 21/482 | |
| | | | 345/156 | |
| 2008/0238879 A1* | 10/2008 | Jaeger | G06F 3/0338 | |
| | | | 345/173 | |
| 2009/0033632 A1 | 2/2009 | Szolyga et al. | | |
| 2010/0053085 A1 | 3/2010 | Hall | | |
| 2012/0038496 A1 | 2/2012 | Edwards | | |
| 2013/0314338 A1 | 11/2013 | Nam et al. | | |
| 2014/0184505 A1* | 7/2014 | Fullerton | A63F 13/21 | |
| | | | 345/158 | |
| 2014/0267150 A1 | 9/2014 | Masashi | | |
| 2015/0168123 A1* | 6/2015 | Hautson | G01R 33/0094 | |
| | | | 702/150 | |
| 2015/0277598 A1 | 10/2015 | Aurongzeb et al. | | |
| 2016/0041678 A1 | 2/2016 | Wu | | |
| 2016/0195937 A1* | 7/2016 | Tachiiri | G06F 3/0338 | |
| | | | 345/157 | |
| 2016/0299606 A1* | 10/2016 | Go | G06F 3/04883 | |
| 2016/0313819 A1 | 10/2016 | Ancona et al. | | |
| 2018/0154774 A1* | 6/2018 | Park | B60R 11/0229 | |
| 2018/0314316 A1 | 11/2018 | Xu et al. | | |
| 2019/0113966 A1 | 4/2019 | Connellan et al. | | |
| 2019/0187856 A1 | 6/2019 | Bruwer et al. | | |
| 2019/0302904 A1* | 10/2019 | Nieh | G06F 3/044 | |
| 2019/0339776 A1 | 11/2019 | Rosenberg et al. | | |
| 2020/0004346 A1* | 1/2020 | Vlasov | H01F 7/0226 | |
| 2020/0371625 A1 | 11/2020 | Katsurahira et al. | | |
| 2022/0200337 A1 | 6/2022 | Watanabe | | |
| 2022/0342437 A1* | 10/2022 | Xie | F24C 7/082 | |
| 2022/0352635 A1 | 11/2022 | Compton | | |
| 2024/0382272 A1 | 11/2024 | Sprenger | | |

* cited by examiner

Magnet
230

Sensing
Element 202

Magnet
230

Sensing
Element 202

Linkage
250

Magnet
230

Structural
Member
246

Linkage
250

Structural
Member
248

DIAL BASED HUMAN INTERFACE DEVICE

FIELD

Embodiments disclosed herein relate generally to user input in computing systems. More particularly, embodiments disclosed herein relate to systems and methods to obtain user input.

BACKGROUND

Computing devices may provide computer implemented services. The computer implemented services may be used by users of the computing devices and/or devices operably connected to the computing devices. The computer implemented services may be performed using input from users. For example, users of computing devices may provide input as part of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
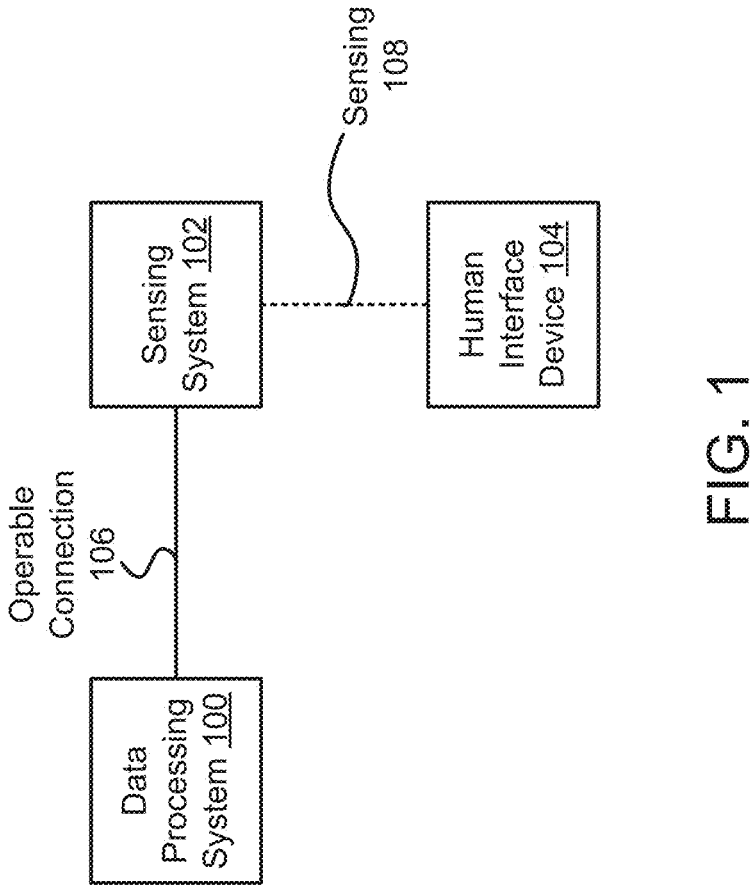
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide the computer implemented services, user input may be obtained.

To obtain the user input, a human interface device may be used. The human interface device may be actuated by a user, and the actuations may be translated into magnetic field distributions detectable by a sensing system. The sensing system may sense the magnetic field distributions and obtain information reflecting changes in the position and/or orientation of the human interface device. The magnetic field distribution may be generated using permanent magnets of the human interface device. Thus, information reflecting actuations of the human interface device by the user may be encoded in the magnetic field distributions and may be sensed.

By doing so, a system in accordance with embodiments disclosed herein may have improved portability and usability when compared to other types of devices used to obtain user input that may be powered. Thus, embodiment disclosed herein may address, among others, the technical challenge of loads placed on users during acquisition of user input and mechanical or electrical failure of devices tasked with obtaining the user input.

In an embodiment, a human interface device is provided. The human interface device may include a top portion for receiving forces applied by a user, the top portion being adapted to: rotate with respect to a bottom portion in response to a first force applied by a user, and translate from a first position to a second position with respect to the bottom portion when a second force is applied by the user; a permanent magnet positioned to rotate and translate with the top portion, the permanent magnet being adapted to generate a magnet field distribution to encode user input received by the human interface device via the forces applied by the user; and the bottom portion adapted to be in contact with a surface on which the human interface device is placed.

The human interface device may be a passive device.

The human interface device may not include semiconductor based devices.

The top portion may include a cap adapted to receive an appendage of a user.

The cap may include a top surface for receiving a palm of the appendage; and a side surface for receiving at least one finger and/or a thumb of the appendage.

The top portion may also include a base that is directly rotationally coupled to the bottom portion; a first structural member attached to and extending upward from the base; and a second structural member attached to and extending downward from the cap.

The top portion may also include a mechanical linkage that directly connects the first structural member to the second structural member, the mechanical linkage being adapted to deform in response to the second force.

The deformation of the linkage may allow the cap to translate to the second position.

The magnet may be attached to the cap, and the top portion may also include a tactile feedback element positioned with the base; and an interface element positioned with the permanent magnet, the interface element may be adapted to actuate the tactile feedback element when the top portion translates from the first position to the second position.

The first position may be an at rest position to which the top portion is adapted to return.

In an embodiment, a system is provided. The system may include a human interface device as discussed above, and a sensing system to monitor the human interface device.

In an embodiment, a method of operating a data processing system is provided. The method may include obtaining user input using a human interface device and sensing system, as discussed above.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, user input may be obtained. The user input may indicate, for example, how the computer implemented services are to be provided. The user input may include any type and quantity of information.

To obtain the user input, a user may perform physical actions such as, for example, pressing buttons, moving structures, etc. These physical actions may be sensed by various devices, and the sensing may be interpreted (e.g., translated) into the user input (e.g., data).

However, sensing physical actions by a user may involve use of sensors and/or devices that may consume power. The weight of the devices and forces applied by sources of the consumed power (e.g., batteries, cords to power supplies, etc.) may place a load (e.g., mechanical) on the user attempting to perform the physical actions. The mechanical load may fatigue the user, reduce the portability of the devices (e.g., mouses), and/or may be undesirable for other reasons.

In general, embodiments disclosed herein may provide methods, systems, and/or devices for obtaining user input and/or using the obtained user input to provide computer implemented services. To provide the computer implemented services, a system may include data processing system 100.

Data processing system 100 may include hardware components usable to provide the computer implemented services. For example, data processing system 100 may be implemented using a computing device such as a laptop computer, desktop computer, portable computer, and/or other types of computing devices.

Data processing system 100 may host software that may use user input to provide the computer implemented services. For example, the software may provide user input fields and/or other elements through which the user may provide information to manage and/or use the computer implemented services provided by data processing system 100.

To obtain the information from the user, data processing system 100 may obtain signals and/or data from sensing system 102 (e.g., via operable connection 106). Data processing system 100 may interpret (e.g., translate) the signals (e.g., may be analog, data processing system 100 may include an analog to digital converter) and/or data (e.g., digital data) to obtain the user input.

Sensing system 102 may track (e.g., by sensing 108) and/or provide information regarding tracking of human interface device 104, and provide the signals and/or data to data processing system 100. A user may physically interact with human interface device 104, thereby allowing the signals and/or data provided by sensing system 102 to include information regarding the physical actions of the user.

For example, if a user moves human interface device 104, sensing system 102 may track the change in position and/or motion of human interface device 104 (and/or portions thereof) and provide signals and/or data reflecting the changes in position and/or motion. Similarly, if a user actuates an actuatable portion (e.g., buttons) of human interface device, sensing system 102 may track the actuation of the actuatable portion and provide signals and/or data reflecting the actuation.

To track human interface device 104, sensing system 102 may include one or more sensors that sense a magnetic field distribution emanating from human interface device 104. The sensors may use the sensed magnetic field distribution to track a location (absolute or relative) and orientation (absolute or relative) of one or more magnets embedded in human interface device 104. The sensors may generate the signals and/or data provided by sensing system 102 to data processing system 100. The sensors may sense the magnitude and/or direction of the magnetic field distribution that passes proximate to each sensor (or a portion of). By knowing the relative placements of the sensors with respect to one another, the position and/or orientation of the one or more magnets may be known (e.g., the magnetic field distribution may be treated as emanating from the one or more magnets with known dimensions and/or field strength generation capabilities).

Sensing system 102 may also include, for example, analog to digital converters, digital signal processing devices or other signal processing devices, and/or other devices for generating the signals and/or data based on information obtained via the sensors.

Human interface device 104 may be implemented with a physical device that a user may actuate in one or more ways. For example, human interface device 104 may (i) be rotatable, and (ii) may include one or more buttons. Actuating human interface device 104 may change the orientation and/or position of the one or more magnets with respect to the sensors of sensing system 102.

Figure 2A:
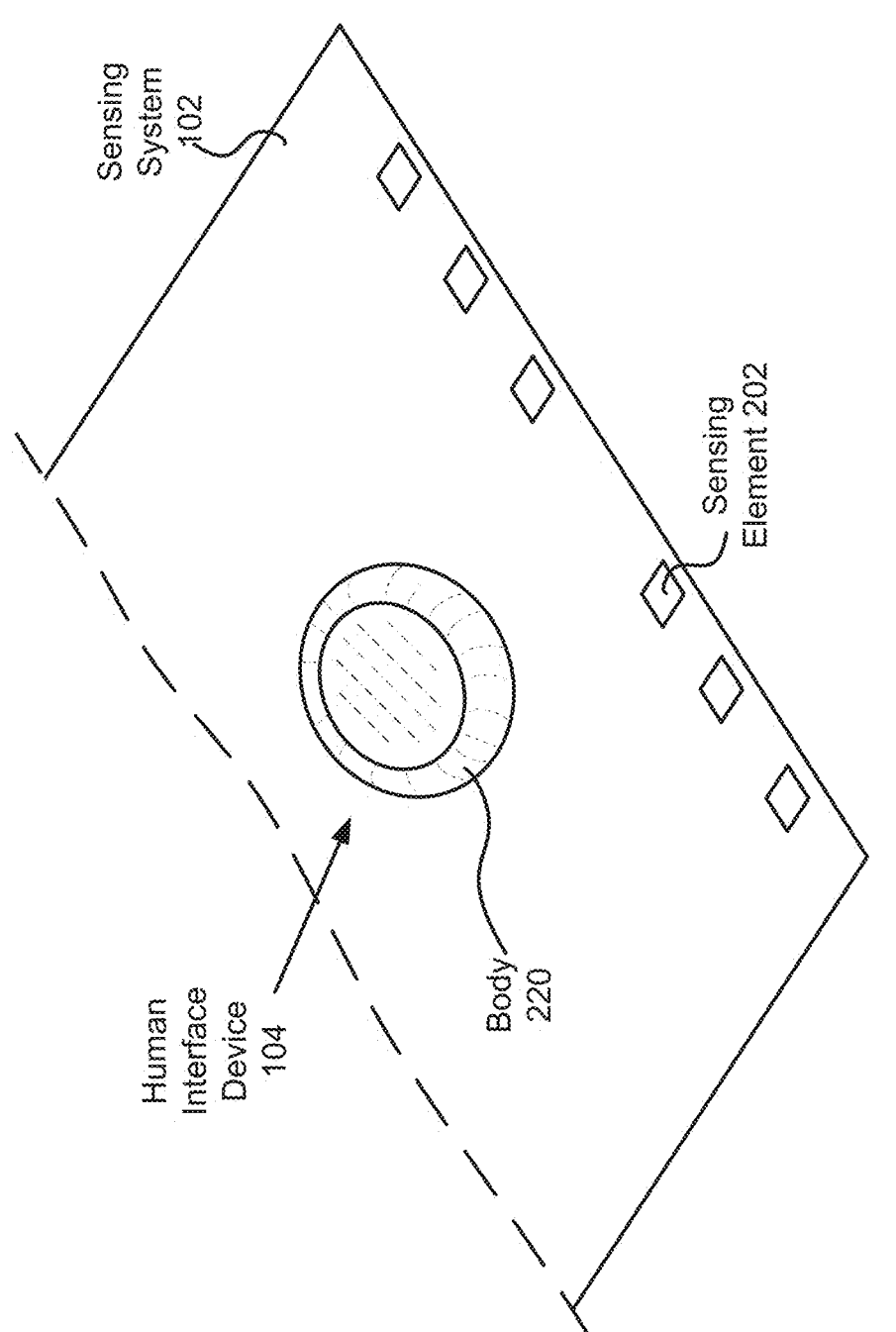
FIG. 2A shows a diagram illustrating a human interface device and a sensing system in accordance with an embodiment.
Figure 2B:
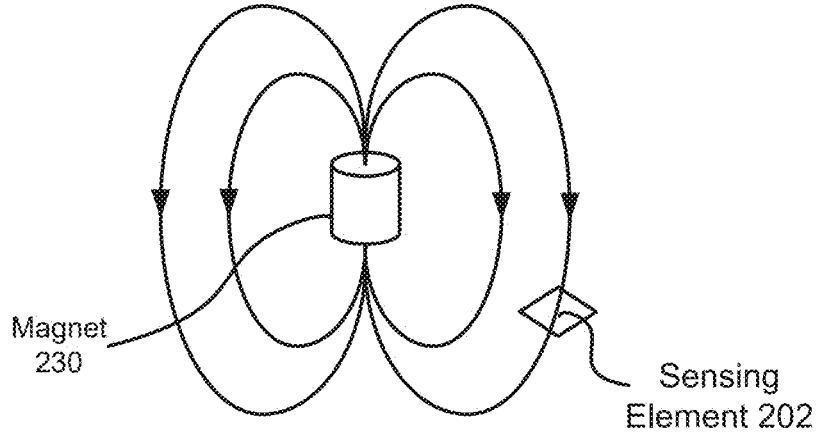
FIGS. 2B-2C show diagrams illustrating field sensing in accordance with an embodiment.
Figure 2C:
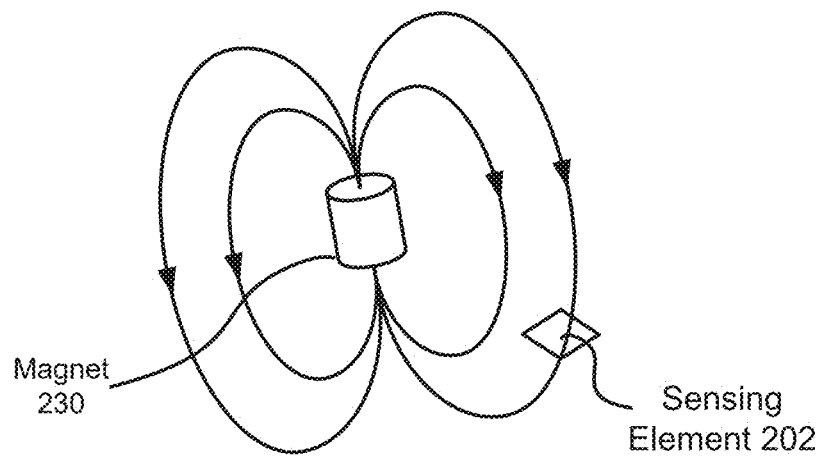

For example, when human interface device 104 is rotated with respect to sensing system 102, the strength and/or orientation of the magnetic field distribution emanating from the one or more magnets as sensed by sensors of sensing system 102 may change. Similarly, when buttons or other actuatable elements of human interface device 104 are actuated, the one or more magnets may be translated (e.g., in one or more planes) thereby changing the strength of the magnetic field distribution sensed by sensors of sensing system 102. Refer to FIGS. 2A-2C for additional details regarding sensing of human interface device 104.

Human interface device 104 may be a passive device. For example, human interface device 104 may not consume power, include batteries, sensors, semiconductor based components/devices (e.g., chips), etc. Consequently, human interface device 104 may be of smaller size, lower weight, and/or may provide other advantages when compared to active devices such as a computer mouse. Refer to FIGS. 2D-2I for additional details regarding human interface device 104.

Data processing system 100 may perform a lookup or other type of operation to translate the signals and/or data from sensing system 102 into user input. Once obtained, the user input may be used to drive downstream processes (e.g., selections via a graphical user interface, indexing through data, etc.).

Figure 3:
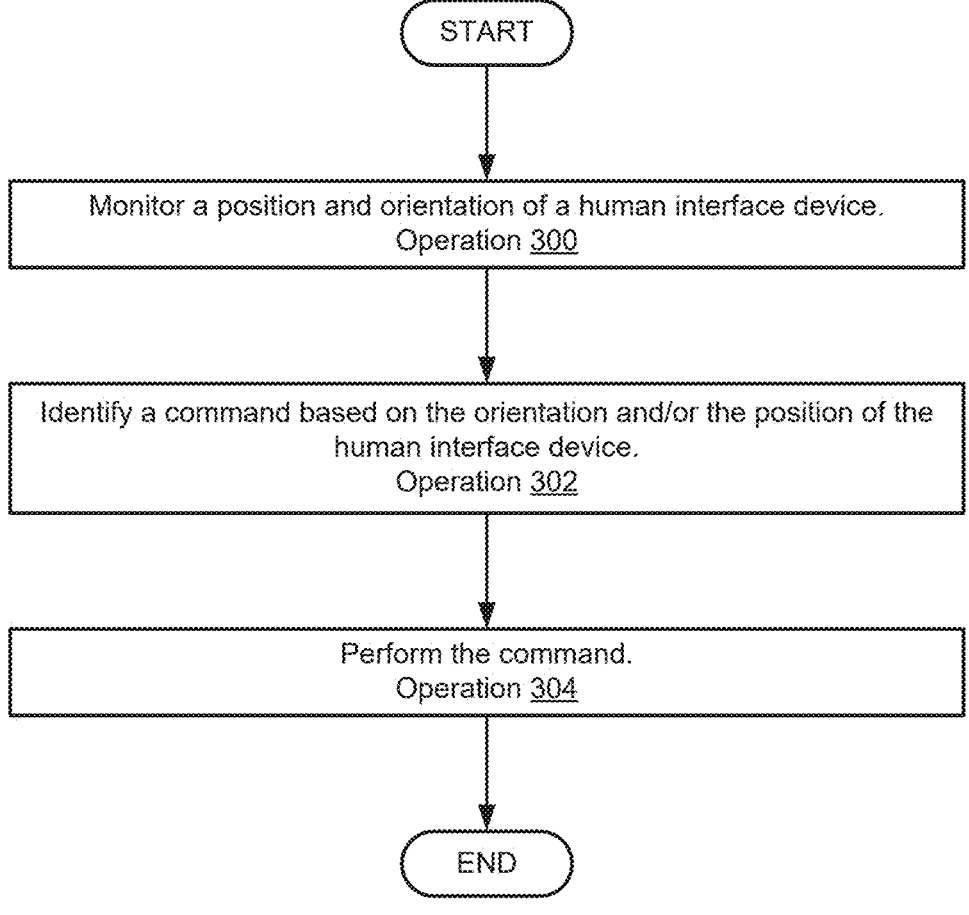
FIG. 3 shows a flow diagram illustrating a method of obtaining user input and providing computer implemented services in accordance with an embodiment.

When providing its functionality, data processing system 100 may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated). For example, sensing system 102 may be operably connected to data processing system 100 via a wired (e.g., USB) or wireless connection and/or via networks. However, in some embodiments, human interface device 104 may not be operably connected to other device (e.g., may be a passive device), but may be sensed by sensing system 102 via sensing 108. For example, during sensing 108, a static magnetic field distribution emanating from human interface device 104 and generated by a permanent magnet therein may be sensed by sensing system 102.

While illustrated in FIG. 1 as included a limited number of specific components, a system in accordance with an embodiment may include fewer, additional, and/or different components than those illustrated therein.

To further clarify embodiments disclosed herein, diagrams illustrating sensing of human interface device 104 in accordance with an embodiment are shown in FIGS. 2A-2C.

Turning to FIG. 2A, an isometric diagram of human interface device 104 and sensing system 102 in accordance with an embodiment is shown.

To obtain user input, human interface device 104 may include body 220 in which a permanent magnet is positioned. The magnet may be coupled to body 220 and to which a user may apply rotational and/or translational force (e.g., may push down on body 220). For example, a user may rest a palm of a hand (e.g., an appendage) on a top surface of body 220, and may grasp side surfaces of body 220 with fingers/thumb. The user may apply force to body 220 which may cause body 220 to rotate and/or move downward.

To obtain user input, sensing system 102 may include any number of sensing elements (e.g., 202). The sensing elements may be sensors that monitor a magnitude and direction of a magnetic field distribution, and generate signals or data to reflect these quantities. While not shown, sensing system 102 may include a signal processing chain (e.g., any number of signal conditioning and processing devices) that may condition and process the signals generated by the sensing elements to obtain information regarding the location and/or orientation of the pair of magnets embedded in human interface device 104.

In FIG. 2A, sensing system 102 is illustrated in the form of a mat, a pad or other structure upon which human interface device 104 may be positioned (the dashed line to the top left of the drawing indicates that the structure may continue on beyond that which is explicitly illustrated). However, sensing system 102 may be implemented with other types of structures.

Additionally, while the sensing elements are illustrated with example positions, it will be appreciated that the sensing elements may be positioned differently without departing from embodiments disclosed herein.

Turning to FIGS. 2B-2C, diagrams illustrating a magnet and sensing element 202 in accordance with an embodiment are shown. As noted above, human interface device 104 may include a magnet (e.g., 230). The magnet may project a static magnetic field distribution. In these figures, the magnetic field is illustrated using lines with arrows superimposed over the midpoints of the lines. The direction of the arrow indicates and orientation of the field.

As seen in FIG. 2B, when the magnet is proximate (e.g., within a predetermined distance range, which may vary depending on the strength of the magnet and a sensitivity level of sensing element 202) to sensing element 202, the magnetic field may be of sufficient strength to be measurable by sensing element 202. Sensing element 202 may utilize any sensing technology to measure the magnitude and/or the orientation of the magnetic field at its location. Due to the field distribution of the magnet, the magnitude and orientation of the magnetic field at the location of sensing element 202 may be usable to identify, in part, the location and orientation of the magnetic.

For example, when magnet 230 is rotated as shown in FIG. 2C from the orientation as shown in FIG. 2B, the direction and/or magnitude of the magnetic field at the location of sensing element 202 may change. By identifying the magnitude and orientation of the magnetic field at a number of locations (e.g., corresponding to different sensing elements), the position and orientation of magnet 230 may be identified. This may allow for rotation and/or translation of the human interface device to be identified, and which may be caused by the user.

Although one individual magnet (e.g., magnet 230) is depicted in FIGS. 2B-2C, it is to be understood that multiple magnets may be included in a human interface device. For example, human interface device 104 may include a pair of magnets that emanate a magnetic field distribution which may be sensed and used to identify the position/orientation of the magnets.

Figure 2D:
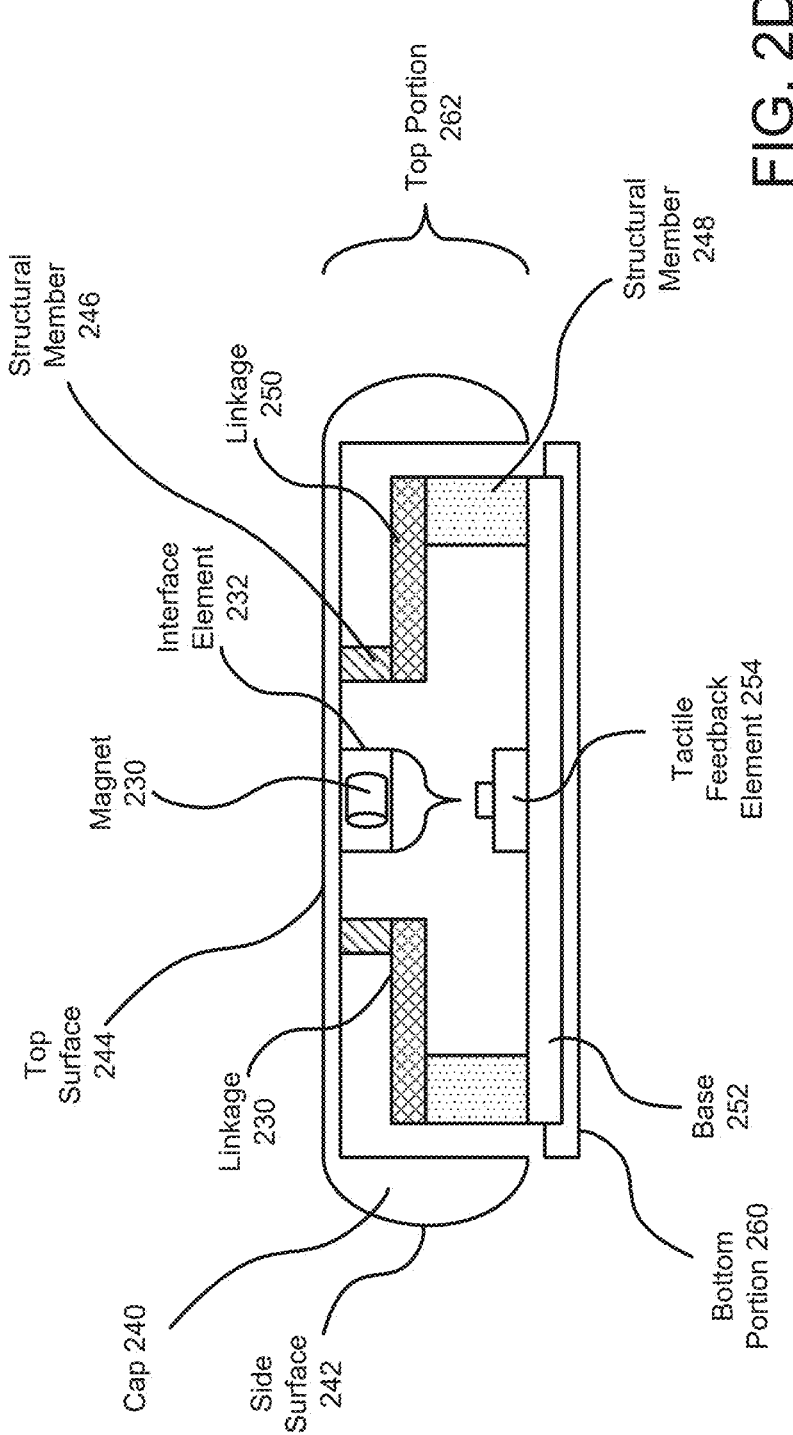
FIGS. 2D-2I show diagrams illustrating a human interface device in accordance with an embodiment.
Figure 2E:
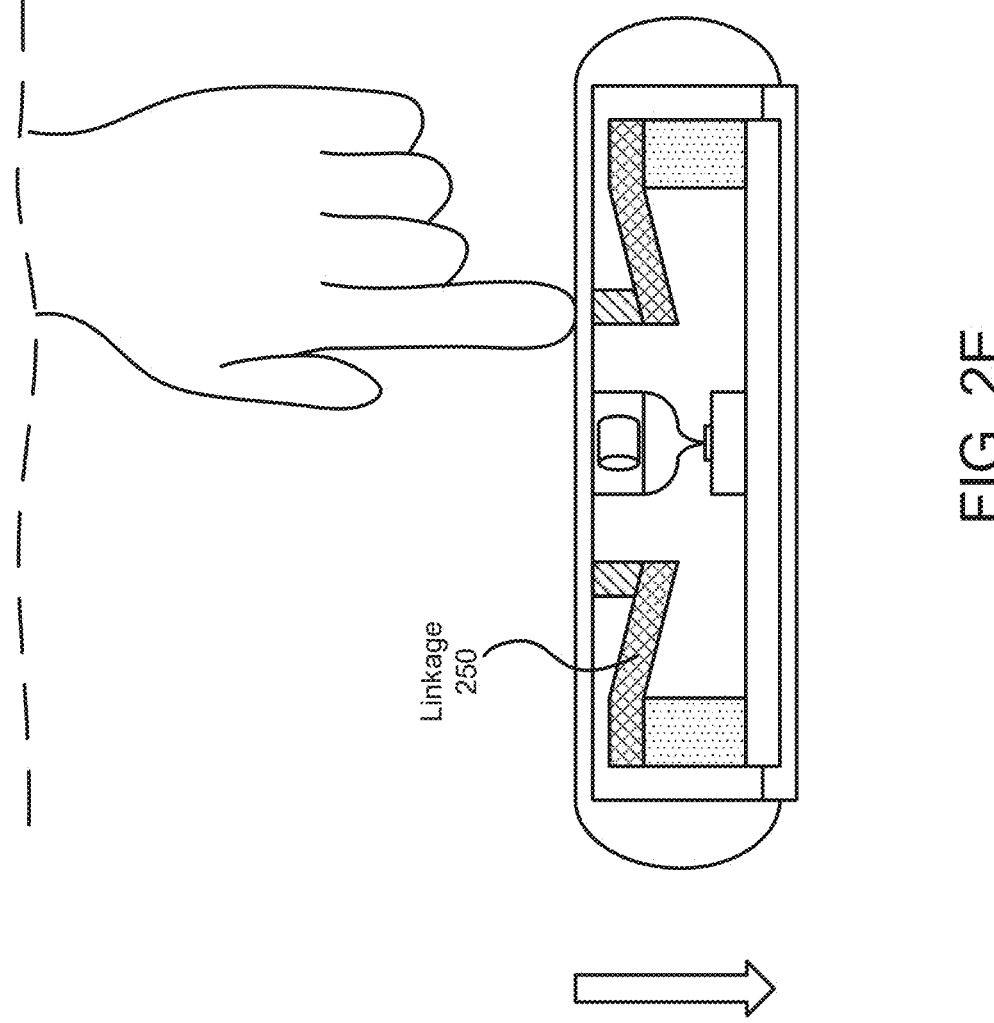
Figure 2F:
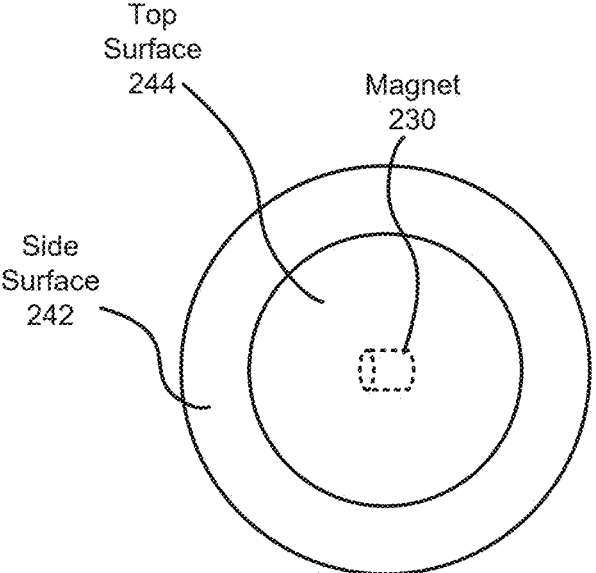
Figure 2G:
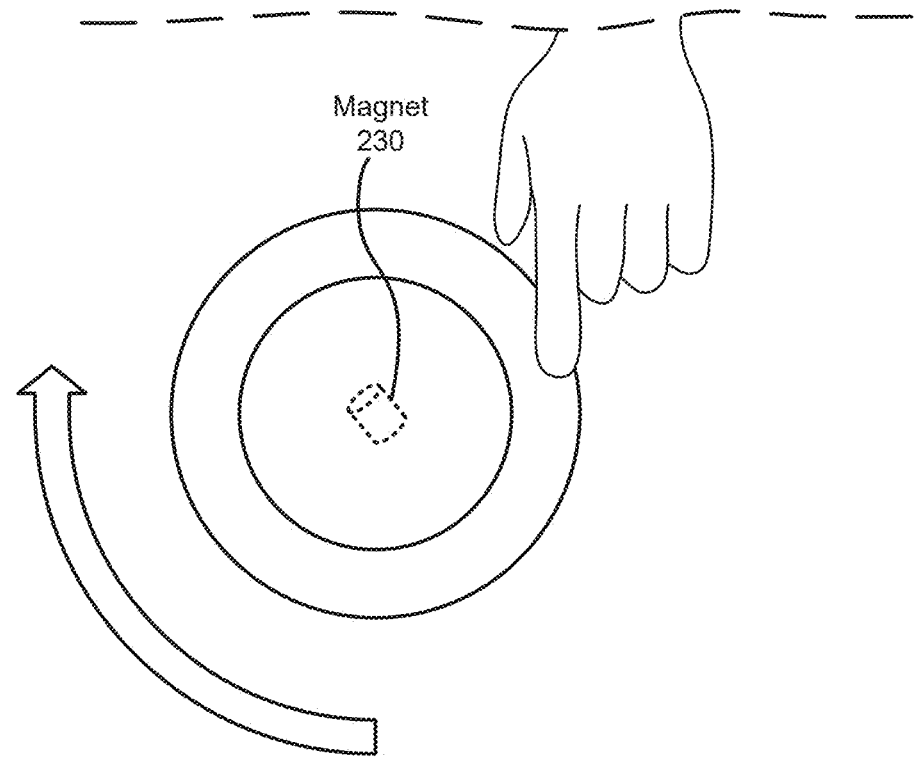
Figure 2H:
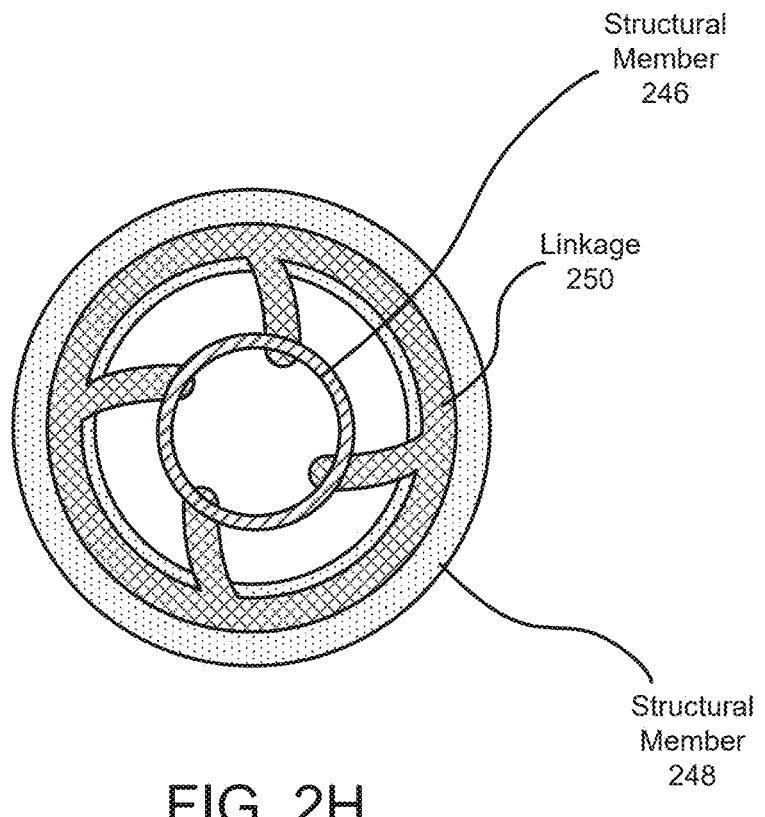
Figure 2I:
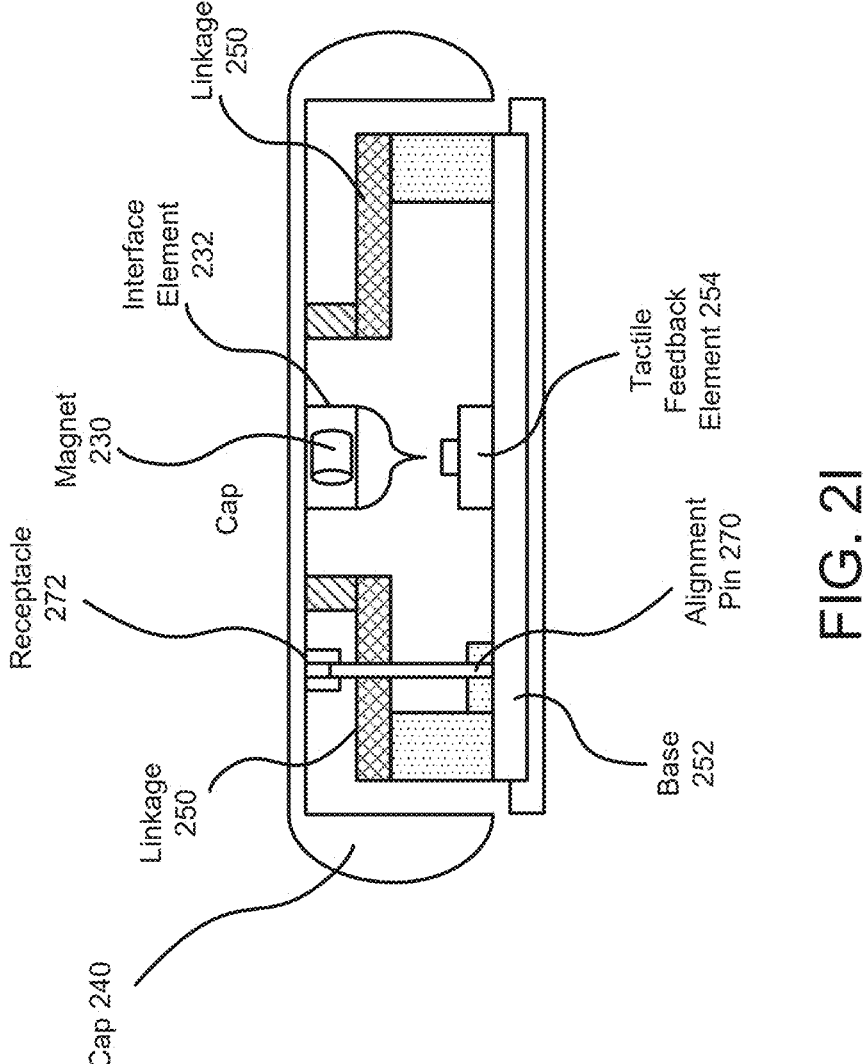

Turning to FIGS. 2D-2I, diagrams showing views of a human interface device in accordance with an embodiment. FIGS. 2D, 2E, and 2I show cross section diagrams illustrating example internal components of a human interface device, FIGS. 2F-2G show top view diagrams illustrating the human interface device, and FIG. 2H shows a top view diagram of a portion of the components of a human interface device in accordance with embodiments.

Turning to FIG. 2D, a cross section diagram illustrating example components of a human interface device in accordance with an embodiment. To provide its functionality, human interface device 104 may include top portion 262 and bottom portion 260. Each of these components is discussed below.

Bottom portion 260 may be a structure adapted to (i) make physical contact with a surface on which human interface device 104 is positioned and (ii) support top portion 262. For example, bottom portion 260 may include a plate on which top portion 262 is positioned. The plate may include raised edges or other structures to retain top portion 262 on bottom portion 260. Bottom portion may also include features that enable top portion 262 to rotate on bottom portion 260. For example, base 252 may generally have a disk shape, and may be coupled to bottom portion 260 via a rotational joint or other feature.

Additionally, bottom portion may include grips or other features that grip the surface on which bottom portion 260 is positioned.

Top portion 262 may be adapted to (i) rotate with respect to bottom portion 260, (ii) translate toward and away from (e.g., within a range) bottom portion 260), (iii) generate a magnetic field that encodes the rotation/translation of top portion 262, (iv) provide feedback to a user, and/or provide other functionalities. To do so, top portion 262 may include cap 240, structural members (e.g., 246, 248), a linkage (e.g., 250), base 252, and tactile feedback element 254. Each of these components is discussed below.

Cap 240 may be a top portion of the human interface device. Cap 240 may include a structure to which a user may apply force. For example, cap 240 may include a top surface 244 which may receive a palm of a user, and may include side surface 242 which may receive one or more fingers and/or thumb of the user. Cap 240 may generally appear to be rotationally symmetric, and may include feature that enable magnet 230 to be fixedly attached to it. Consequently, magnet 230 may move with cap 240 based on force applied by the user.

Structural members 246, 248 may connect cap 240 to base 252. Structural member 246 and 248 may each have an annulus shape (e.g., ring like, but may have a square cross section), and structural member 248 may be of larger diameter than structural member 246. Structural member 246 may be attached to top surface 244, and structural member 248 may be attached to base 252.

Linkage 250 may connect structural member 246 to structural member 248. Linkage may enable cap 240 to translate towards and away from base 252.

For example, turning to FIG. 2E which also shows a cross section view of the human interface device in accordance with an embodiment, linkage 250 may be partially deformable. As seen in FIG. 2E, when a user applies downward force to top surface 244 of sufficient magnitude, linkage 250 may deform allowing cap 240 to move downward toward bottom portion 260. This motion is emphasized in FIG. 2E using an oversized arrow.

Returning to the discussion of FIG. 2D, linkage 250 may have a complex shape that generally lies within a plane. Refer to FIG. 2G for additional details regarding the shape of linkage 250.

To provide a user with confirmation that cap 240 has moved a desired distance (e.g., detectable amount of change in the magnet field distribution from magnet 230), tactile feedback element 254 may be positioned below magnet 230 (e.g., on base 252). Tactile feedback element 254 may be implemented with a button, switch, or other structure that makes clicking noises and/or provides haptic feedback when it has been actuated sufficient. To enable depressions of cap 240 to actuate tactile feedback element 254, interface element 232 may be positioned with cap 240 and/or magnet 230. Interface element may be a structure having a point or end, and positioned so that the point or end actuates tactile feedback element 254 when cap 240 is depressed a sufficient distance. For example, as seen in FIG. 2E, the end of interface element 232 may depress a button or other portion of tactile feedback element 254.

Base 252 may support structural members 246, 248, linkage 250, and cap 240, and rotate with respect to bottom portion 260. For example, base 252 may generally be disk shaped and may include features that allow it to rotate with respect to bottom portion 260. Consequently, when rotational force is applied to side surface 242, base 252, structural members 246, 248, linkage 250, and cap 240 may all rotate together. By virtue of its attachment to cap 240, magnet 230 may similarly rotate.

For example, turning to FIGS. 2F-2G which show top views of the human interface device in accordance with an embodiment, magnet 230 (e.g., drawn in dashing to indicate that it is below top surface 244) may be oriented across the width of the human interface device. When rotation force is applied to side surface 242, as shown in FIG. 2G, cap 240 and magnet 230 may rotate thereby changing the orientation and distribution of the field emanating from human interface device. In FIG. 2G, the rotation of magnet 230 is illustrated using the oversized arrow.

Returning to the discussion of FIG. 2D, linkage 250 may enable rotation force applied to cap 240 to be transmitted to base 252. Consequently, base 252 may also rotate with respect to bottom portion 260 when such force is applied.

For example, turning to FIG. 2H which also shows top view of structural member 246, linkage 250, and structural member 248 in accordance with an embodiment, linkage 250 may include a first portion (e.g., ring) that is adapted to sit and/or be attached to structural member 248.

Linkage 250 may also include arms or other structures that extend inward from the ring. These arms may support structural member 246 (e.g., and the other components connected to it such as cap 240). The arms may operate as springs thereby allowing the cap to move downward and then return upward after force that depressed the cap is released.

In addition to those features shown in FIG. 2H, any of structural member 246, linkage 250, and structural member 248 may include other features (not shown) to facilitate (i) attachment of components of the human interface device (e.g., bolt holes, threaded holes, etc.), (ii) guiding of components of the human interface device (e.g., e.g., supports for guide pins), etc.

For example, turning to FIG. 2I which shows a view similar to that shown in FIG. 2D in accordance with an embodiment, to maintain alignment between cap 240 and base 252 and/or bottom portion 260, alignment pin 270 may be positioned with structural member 248 and linkage 250. For example, structural member 248 may include a recess and linkage 250 may include a hole in an arm that are stacked vertically with respect to one another. These features may allow alignment pin 270 to be inserted. A receptacle (e.g., 272) for alignment pin 270 may be positioned with (e.g., attached to) cap 240. Consequently, alignment pin 270 may retain alignment of cap 240 with respect to base 252 and/or bottom portion 260. Accordingly, deformation of the arms of linkage 250 may only allow cap 240 to move towards and away from base 252 and bottom portion 260 (e.g., align alignment pin 270).

While FIGS. 2A-2I have been illustrated as including specific numbers and types of components, it will be appreciated that any of the devices depicted therein may fewer, additional, and/or different components without departing from embodiments disclosed herein.

As discussed above, the components of FIG. 1 may perform various methods to provide computer implemented services using user input. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of obtaining user input in accordance with an embodiment is shown. The method may be performed by data processing system 100, sensing system 102, human interface device 104, and/or other components of the system of FIG. 1.

At operation 300, an orientation and/or position of a human interface device, or portions thereof, is monitored. The orientation and/or position may be monitored by (i) obtaining measurements of a magnetic field distribution emanating (e.g., outside of the human interface device) from at least one magnet positioned in the human interface device, and (ii) computing the orientation and/or position based on the measurement.

For example, a rotational angle and displacement distance may be calculated. The displacement distance may be a distance that a cap of the human interface device is depressed. The rotational angle may be an angle of the cap with respect to a sensing system used to obtain the measurement of the magnetic field distribution.

At operation 302, a command is identified based on the orientation and/or position of the pair of magnets. The command may be identified, for example, by comparing the position and/or orientation to a past position and/or orientation. For example, a change in displacement distance may indicate that the cap has been pressed down or released and allowed to travel to an at rest position (e.g., up from the down position). Likewise, the change in orientation may indicate that a user rotated the cap.

These relative changes may be associated with different types of operations. For example, changes in rotation of the cap may indicate that a scrolling function of a computer program is being activated, and repression/release of the cap may indicate that a particular function is to be engaged or disengaged. The specific functions may depend on the program being run on a data processing system connected to a sensing system monitoring the human interface device while the changes to the human interface device are sensed.

At operation 304, the command is performed. The command may be performed, for example, by an operating system passing through or otherwise providing information regarding the command to an application or other consumer of the user input. The consumer of the command may then take action based on the command.

For example, a data processing system may host an application that will scroll through documents forwards and/or backwards based on rotation of the cap, and depressing of the cap may magnify a currently scrolled document while releasing that cap may return the zoom level to a nominal level.

The method may end following operation 304.

Thus, using the method illustrated in FIG. 3, embodiments disclosed herein may facilitate obtaining user input and using the user input to provide computer implemented services. By obtaining the user input via a passive device (at least with respect to user input), a human interface device in accordance with embodiments disclosed herein may be of lower complexity thereby improving the likelihood of continued operation, may not be dependent on power sources, may not require as large of physical loads to be exerted by users, and may provide other benefits.

Figure 4:
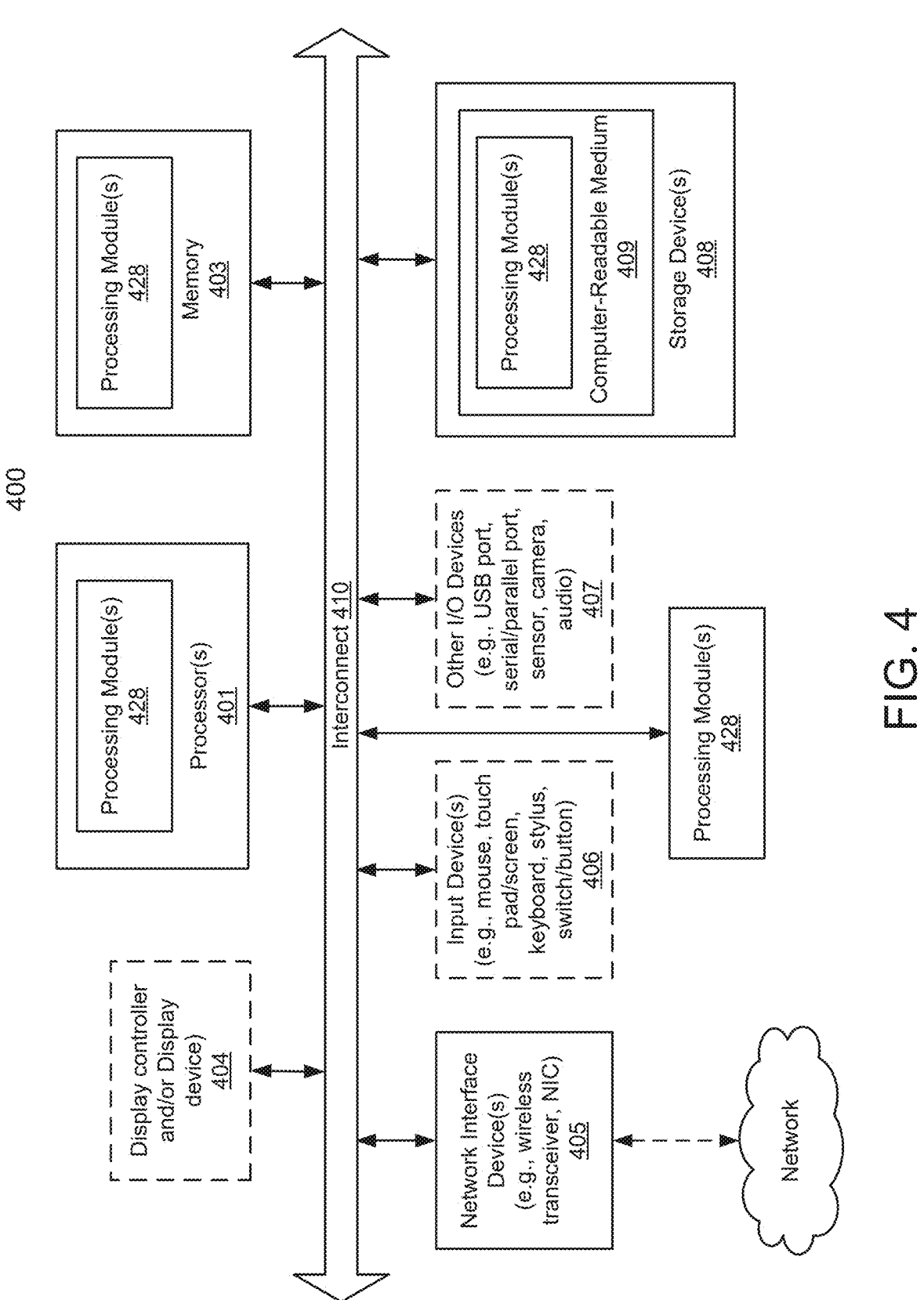
FIG. 4 shows a block diagram illustrating a data processing system in accordance with an embodiment.

Any of the components illustrated in FIGS. 1-2I may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above.

Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A human interface device, comprising:
a top portion for receiving forces applied by a user, the top portion being adapted to:
rotate with respect to a bottom portion in response to a first force applied by a user, and
translate from a first position to a second position with respect to the bottom portion when a second force is applied by the user;
a permanent magnet positioned to rotate and translate with the top portion, the permanent magnet being adapted to generate a magnet field distribution to encode user input received by the human interface device via the forces applied by the user; and
the bottom portion adapted to be in contact with a surface on which the human interface device is placed,
wherein the permanent magnet is positioned such that orientations of poles of the permanent magnet change in response to a rotation of the top portion.

2. The human interface device of claim 1, wherein the human interface device is a passive device.

3. The human interface device of claim 1, wherein the human interface device does not include semiconductor based devices.

4. The human interface device of claim 1, wherein the top portion comprises:
a cap adapted to receive an appendage of a user.

5. The human interface device of claim 4, wherein the cap comprises:
a top surface for receiving a palm of the appendage; and
a side surface for receiving at least one finger and/or a thumb of the appendage.

6. The human interface device of claim 4, wherein the top portion further comprises:
a base that is directly rotationally coupled to the bottom portion;
a first structural member attached to and extending upward from the base; and
a second structural member attached to and extending downward from the cap.

7. The human interface device of claim 6, wherein the top portion further comprises:
a mechanical linkage that directly connects the first structural member to the second structural member, the mechanical linkage being adapted to deform in response to the second force.

8. The human interface device of claim 7, wherein the deformation of the mechanical linkage allows the cap to translate to the second position.

9. The human interface device of claim 7, wherein the permanent magnet is attached to the cap, and the top portion further comprises:
a tactile feedback element positioned with the base; and
an interface element positioned with the permanent magnet, the interface element being adapted to actuate the tactile feedback element when the top portion translates from the first position to the second position.

10. The human interface device of claim 9, wherein the first position is an at rest position to which the top portion is adapted to return.

11. A system, comprising:
a human interface device, comprising:
a top portion for receiving forces applied by a user, the top portion being adapted to:
rotate with respect to a bottom portion in response to a first force applied by a user, and
translate from a first position to a second position with respect to the bottom portion when a second force is applied by the user;
a permanent magnet positioned to rotate and translate with the top portion, the permanent magnet being adapted to generate a magnet field distribution to encode user input received by the human interface device via the forces applied by the user; and
the bottom portion adapted to be in contact with a surface on which the human interface device is placed; and
a sensing system adapted to sense the magnetic field distribution,
wherein the permanent magnet is positioned such that orientations of poles of the permanent magnet change in response to a rotation of the top portion.

12. The sensing system of claim 11, wherein the human interface device is a passive device.

13. The sensing system of claim 11, wherein the human interface device does not include semiconductor based devices.

14. The sensing system of claim 11, wherein the top portion comprises:
a cap adapted to receive an appendage of a user.

15. The sensing system of claim 14, wherein the cap comprises:
a top surface for receiving a palm of the appendage; and
a side surface for receiving at least one finger and/or a thumb of the appendage.

16. The sensing system of claim 14, wherein the top portion further comprises:
a base that is directly rotationally coupled to the bottom portion;

a first structural member attached to and extending upward from the base; and a second structural member attached to and extending downward from the cap.

17. The sensing system of claim 16, wherein the top portion further comprises:

a mechanical linkage that directly connects the first structural member to the second structural member, the mechanical linkage being adapted to deform in response to the second force.

18. The sensing system of claim 17, wherein the deformation of the mechanical linkage allows the cap to translate to the second position.

19. The sensing system of claim 17, wherein the permanent magnet is attached to the cap, and the top portion further comprises:

a tactile feedback element positioned with the base; and an interface element positioned with the permanent magnet, the interface element being adapted to actuate the tactile feedback element when the top portion translates from the first position to the second position.

20. The sensing system of claim 19, wherein the first position is an at rest position to which the top portion is adapted to return.

\* \* \* \* \*